United States Patent
Kobayashi

(10) Patent No.: US 6,714,359 B2
(45) Date of Patent: Mar. 30, 2004

(54) LENS BARREL AND CAM RING

(75) Inventor: Tomoaki Kobayashi, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/283,229

(22) Filed: Oct. 30, 2002

(65) Prior Publication Data

US 2003/0081326 A1 May 1, 2003

(30) Foreign Application Priority Data

Oct. 31, 2001 (JP) ......................................... 2001-335435

(51) Int. Cl.[7] ................................................ G02B 15/14
(52) U.S. Cl. ........................ 359/700; 359/699; 359/701
(58) Field of Search ............................... 359/699, 700, 359/701, 823, 704, 819

(56) References Cited

U.S. PATENT DOCUMENTS

| | | | |
|---|---|---|---|
| 4,179,191 A | * 12/1979 | Freudenschuss et al. | .... 359/697 |
| 5,255,124 A | 10/1993 | Iwamura | |
| 5,912,772 A | 6/1999 | Aoki | |
| 6,580,566 B1 | * 6/2003 | Kamoda | ...................... 359/701 |

FOREIGN PATENT DOCUMENTS

| | | | | |
|---|---|---|---|---|
| JP | 408146278 A | * | 6/1996 | ............ G02B/7/04 |
| JP | 411211966 A | * | 8/1999 | ............ G02B/7/08 |

* cited by examiner

*Primary Examiner*—Ricky Mack
(74) *Attorney, Agent, or Firm*—Greenblum & Bernstein, P.L.C.

(57) ABSTRACT

A lens barrel includes a cam ring which is rotatable about an optical axis, and at least two linearly movable members provided inside or outside the cam ring, the linearly movable members being linearly guided in an optical axis direction. A plurality of cams are formed on an inner peripheral surface or an outer peripheral surface of the cam ring. Furthermore, at least two adjacent cams overlap at least partly as viewed in the optical axis direction, one of the two adjacent cams being a cam projection and the other of the two adjacent cams being a cam groove, and a follower recess portion and a follower projection portion, which are relatively movably fitted into the cam projection and the cam groove, respectively, are respectively formed on the linearly movable members.

7 Claims, 5 Drawing Sheets

LENS BARREL AND CAM RING

BACKGROUND OF THE INVENTION

1. Field of the Invention

The present invention relates to a lens barrel, and in particular, relates to a cam ring provided in a lens barrel.

2. Description of the Related Art

In a known lens barrel used in a camera, a single drive ring (cam ring) which is rotated to move a plurality of movable members (in general, lens groups) in an optical axial direction is provided with a plurality of cam projections.

However, if the cam ring has a plurality of cam projections, in case where the cam projections overlap each other in the optical axis direction, it is difficult to mold the cam ring because two molding dies for forming the cam ring should be pulled away from each other in the optical axis direction while being rotated respectively in a direction opposite to each other.

SUMMARY OF THE INVENTION

The present invention provides a lens barrel having a cam ring which can be easily molded.

For example, a cam ring is rotatable about an optical axis, and at least two linearly movable members provided inside the cam ring, the linearly movable members being linearly guided in an optical axis direction. A plurality of cams are formed on an inner peripheral surface or an outer peripheral surface of said cam ring, at least one pair of the cams overlap each other partly or completely as viewed in the optical axis direction, one of the pair of cams is a cam projection and another of the pair of cams is a cam groove, and a follower recess portion and a follower projection portion, which are relatively movably fitted into the cam projection and the cam groove, respectively, are respectively formed on the linearly movable members.

The lens barrel can include a linear movement guide cylinder provided inside the cam ring, the linear movement guide cylinder having at least two linear movement guide grooves extending parallel to the optical axis. At least two radial projections are fitted into corresponding the linear movement guide grooves, wherein the follower projection portion and the follower recess portion are respectively formed on the radial projections.

The cam projection and the cam groove can be linear. Alternatively, the cam projection can be a non-linear cam and the cam groove can be a linear cam.

The linearly movable members can include a first moving frame and a second moving frame, wherein the follower projection portion is formed on the first moving frame, and wherein the follower recess portion is formed on the second moving frame.

According to another embodiment, a lens barrel is provided, including a cam ring which is rotatable about an optical axis, and at least two linearly movable members provided in the cam ring, the linearly movable members being linearly guided in an optical axis direction. The cam ring includes a cam projection and a cam groove, each having a circumferential component and an axial component, formed on an inner peripheral surface of the drive ring. The linearly movable members respectively include a follower recess portion and a follower projection portion, which are relatively movably fitted into the cam projection and the cam groove, respectively.

According to another embodiment, a cam ring of a lens barrel is provided, including a cam projection and a cam groove on an inner peripheral surface of the cam ring, the cam projection and the cam groove having a circumferential component and an axial component. A follower recess portion and a follower projection portion, which are respectively formed on linearly movable members provided inside the cam ring and are linearly guided in an optical axis direction, are relatively movably fitted into the cam projection and the cam groove, respectively.

The present disclosure relates to subject matter contained in Japanese Patent Application No. 2001-335435 (filed on Oct. 31, 2001) which is expressly incorporated herein by reference in its entirety.

BRIEF DESCRIPTION OF THE DRAWINGS

The invention will be discussed below with reference to the accompanying drawings, in which.

DESCRIPTION OF THE PREFERRED EMBODIMENT

Figure 1A:
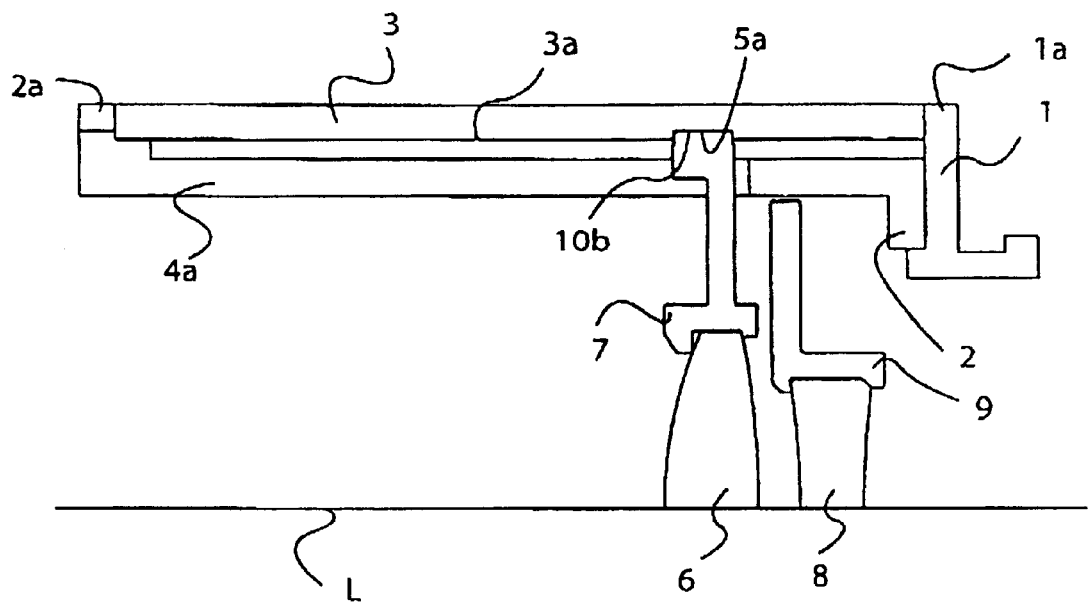
FIG. 1A is a sectional view of an upper half of a lens barrel of the present invention in which different movements of a plurality of lens groups occur, which shows a state where the follower projection 10b fits into the cam groove 5a of the drive ring 3.
Figure 1B:
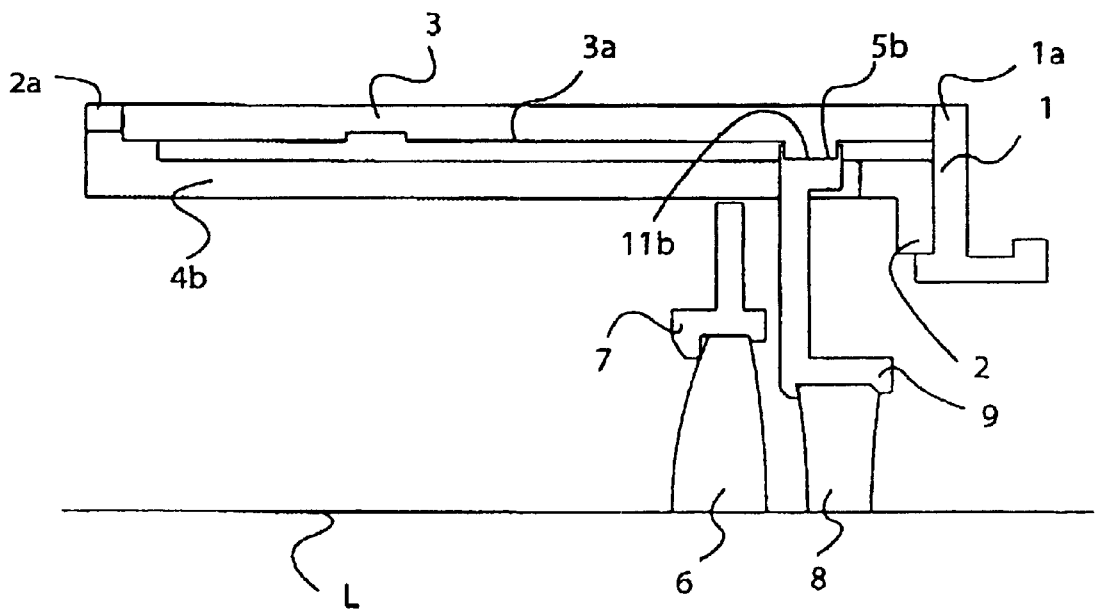
FIG. 1B is a sectional view of an upper half of a lens barrel of the present invention in which different movements of a plurality of lens groups occur, which shows a state where the cam projection 5b of the drive ring 3 fits into the follower groove 10b.
Figure 3:
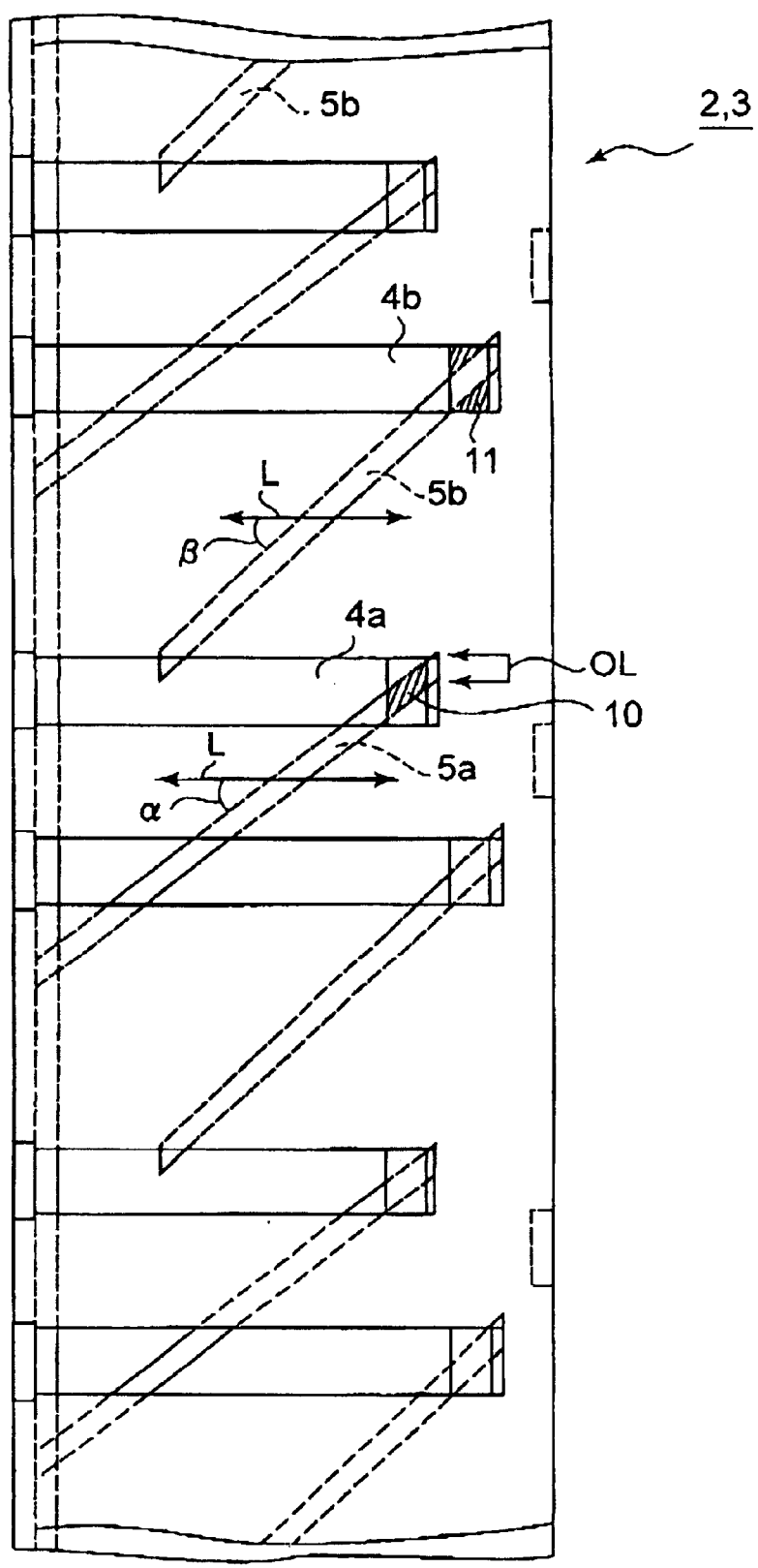
FIG. 3 is an internal developed view of a lens barrel in which a linear movement guide groove drive ring and a drive ring engage.

FIGS. 1A and 1B shows a lens barrel 100 of the present invention. A mount ring 1 attached to a camera body is provided with a linear movement guide cylinder 2 secured thereto, and the linear movement guide cylinder 2 is provided with a plurality of linear movement guide grooves 4a and 4b, having different lengths in a direction parallel with the optical axis L as shown in FIGS. 1A, 1B and 3. The linear guide grooves 4a and 4b are alternately arranged in the circumferential direction and are spaced respectively from one another at a distance of 120 degrees.

A drive ring (cam ring) 3 is provided outside the linear movement guide cylinder 2, the drive ring 3 and the linear movement guide cylinder 2 constituting major components of the lens barrel 100. The drive ring 3 is supported at the opposing ends thereof between a flange portion 1a of the mount ring 1 and a flange portion 2a of the linear movement guide cylinder 2 so that the drive ring 3 can be rotated about the optical axis L not move in the optical axis direction. The drive ring 3 is provided on the inner peripheral surface 3a thereof with a cam groove (cam groove) 5a and a cam projection 5b, corresponding to the linear movement guide grooves 4a and 4b, respectively, as shown in FIGS. 1A, 1B and 3. In the illustrated embodiment, both the cam groove 5a and the cam projection 5b are linear cams.

The cam groove 5a and the cam projection 5b have circumferential components and axial components, respectively. Namely, the cam groove 5a and the cam projection 5b do not extend in a direction parallel with nor perpendicular to the optical axis, and are inclined in the peripheral direction with respect to the optical axis direction L as shown in FIG. 3. An angle a defined between the cam groove 5a and the optical axis direction L is smaller than an angle β defined between the cam projection 5b and the optical axis direction L ($\alpha<\beta$). The ends of the cam groove 5a and the cam projection 5b overlap each other as viewed in the optical axis direction L. The overlapping portion is indicated by OL.

Figure 2A:
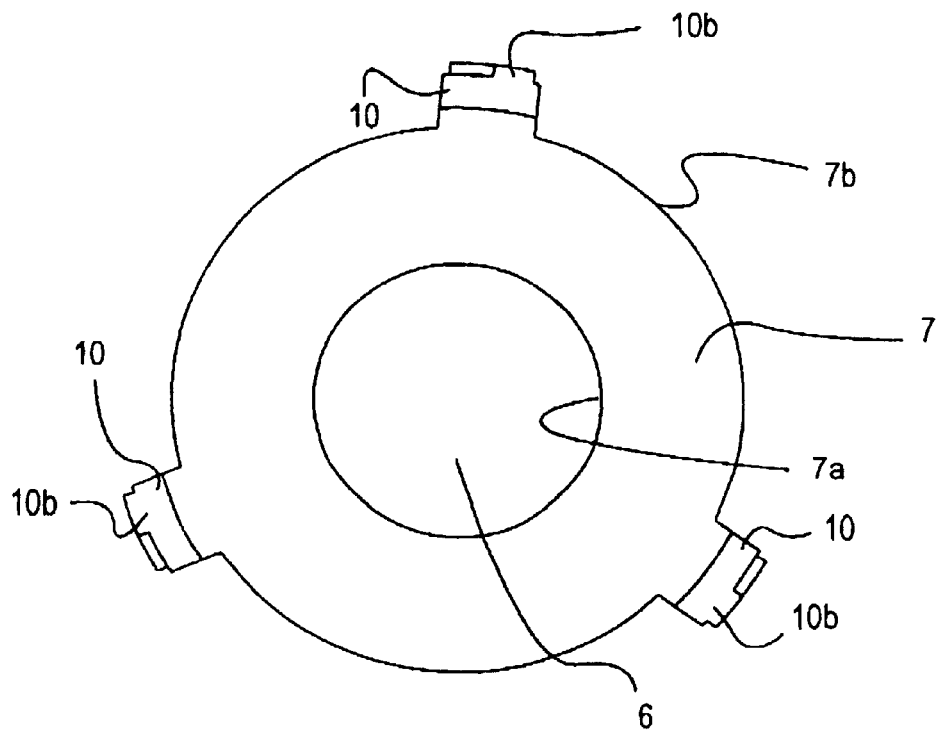
FIG. 2A is a front elevational view of a first moving frame which supports a first lens group.

A first moving frame (linearly movable member) 7 and a second moving frame (linearly movable member) 9 are provided inside the drive ring 3, as shown in FIGS. 1A and 1B. The first moving frame 7 supports a first lens group 6 and the second moving frame 9 supports a second lens group 8, respectively. Namely, as shown in FIG. 2A, the first moving frame 7 is annular so that the first lens group 6 is fitted in the center opening (inner diameter portion) 7a of the first moving frame 7. The first moving frame 7 is provided on the outer peripheral surface 7b thereof with three radial projections 10 that are spaced in the circumferential direction at an equip-angular distance of 120 degrees. The three radial projections 10 are slidably fitted in the corresponding linear movement guide grooves 4a of the linear movement guide cylinder 2, so that the first moving frame 7 is supported in the linear movement guide cylinder 2 to move linearly in the optical axis direction.

The three radial projections 10 are provided on their outer ends with follower projections (follower projection portions) 10b, which extend at an angle a with respect to the optical axis direction L in FIG. 3 and have the same width as that of the cam groove 5a, extend in the radial direction and are slidably fitted in the cam grooves 5a of the drive ring 3. Consequently, when rotation of the drive ring 3 takes place, the follower projections 10b (first moving frame 7 and the first lens group 6) are moved in the optical axis direction L in accordance with the cam profile of the cam grooves 5a.

Figure 2B:
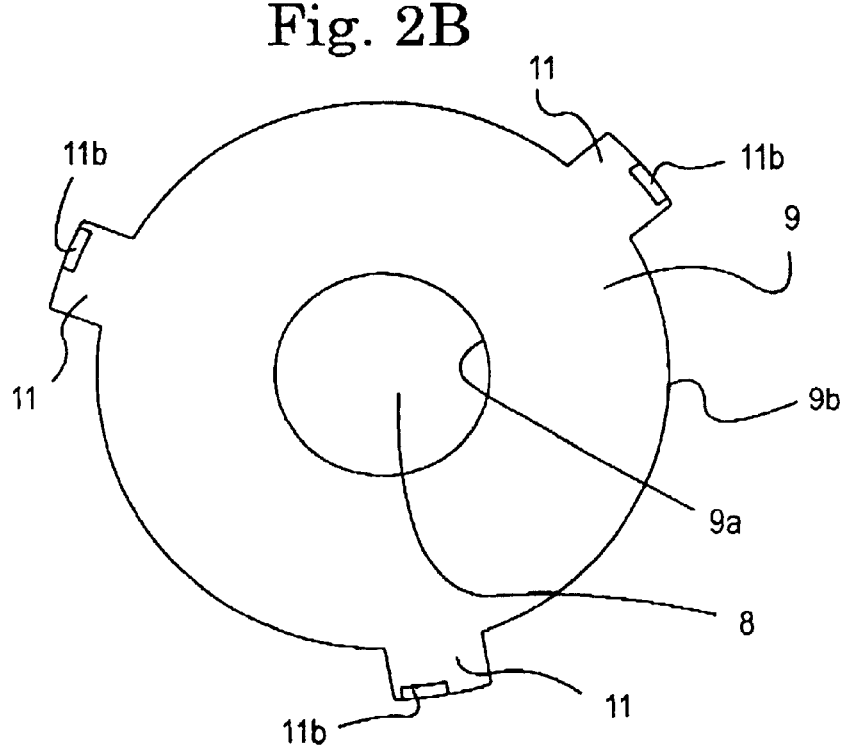
FIG. 2B is a front elevational view of a second moving frame which supports a second lens group.

As shown in FIG. 2B, the second moving frame 9 is annular, so that the second lens group 8 is fitted in the center opening (inner diameter portion) 9a of the second moving frame 9. The second moving frame 9 is provided on the outer peripheral surface 9b thereof with three radial projections 11 that are spaced in the circumferential direction at an equip-angular distance of 120 degrees. The three radial projections 11 are slidably fitted in the corresponding linear movement guide grooves 4b of the linear movement guide cylinder 2, so that the second moving frame 9 is supported in the linear movement guide cylinder 2 to move linearly in the optical axis direction.

The three radial projections 11 are provided on their outer ends with follower recesses (follower recess portions) 11b, which extend at an angle β with respect to the optical axis direction L in FIG. 3 and have the same width as that of the cam projection 5b, in the radial direction, so that the cam projections 5b of the drive ring 3 are slidably fitted in the follower recesses 11b. Consequently, when rotation of the drive ring 3 occurs, the follower recesses 11b (second moving frame 9 and the second lens group 8) are moved in the optical axis direction L, in accordance with the cam profile of the cam projections 5b.

Figure 4:
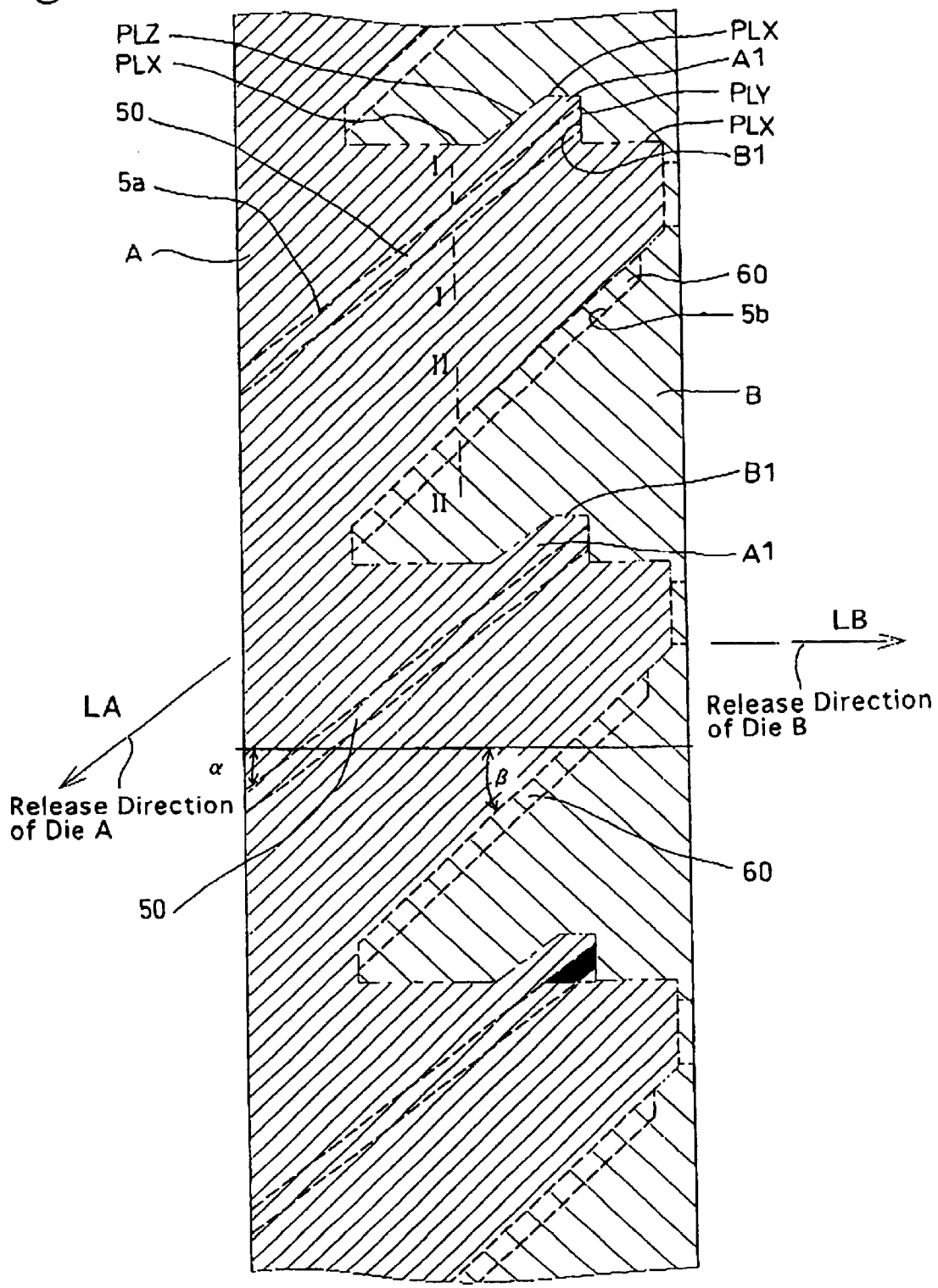
FIG. 4 is a developed view of molding dies to resin-mold a drive ring used in a lens barrel of the present invention.

The molding method and the molding dies used for producing the drive ring 3 will be explained hereinafter. FIG. 4 shows a developed view of a pair of cylindrical split dies (molding dies) A and B. Note that a molding die 90 for producing an annular profile shown in FIG. 5 is not shown in FIG. 4. The cam groove 5a is formed by a projection 50 provided on the cylindrical split die A and the cam projection 5b is formed by a cavity 60 defined between front and rear ends (parting lines) of the cylindrical split dies A and B. The end surface of the cylindrical split die B is provided with a molding cavity 60 for molding the cam projection 5b, along the parting line. The parting line between the two cylindrical split dies A and B includes a parting line group PLX extending parallel to the axis of the drive ring 3, a parting line group PLY extending perpendicularly to the axis of the drive ring 3, a parting line group PLZ inclined in the inclination direction of the cam groove 5a of the cylindrical split die A, and a parting line of angle β for forming the cam projection 5b. The angle $\alpha$ of the projection 50 for forming the cam groove 5a is smaller than the angle β of the molding cavity 60 for forming the cam projection 5b ($\alpha<\beta$)

The projection 50 of the cylindrical split die A is elongated to a circumferential projection A1 extending into the circumferential recess B1 of the cylindrical split die B. A parting line between one circumferential projection A1 and one recess B1 includes a parting line PLX extending parallel to the axis of the drive ring 3, a parting line PLY perpendicular to the axis of the drive ring 3, and a parting fine PLZ inclined in an inclination direction of the cam groove 5a of the cylindrical split die A.

The circumferential projection A1 (recess B1) overlaps the end of the cam projection 5b (molding cavity 60) in the optical axis direction. However, in the present invention, since one of the cams is a cam projection 5b and the other is a cam groove 5a, it is possible to part the cylindrical split die B from the cylindrical split die A by moving the die B linearly in the axial direction after rotating the die A in the direction of the lead angle a of the cam groove 5a, even if the dies A and B have the circumferential projection A1 and recess B1 that overlap each other. Namely, the die A and the die B can be relatively moved in the optical axis direction without rotating them respectively in a direction opposite to each other.

Figure 5A:
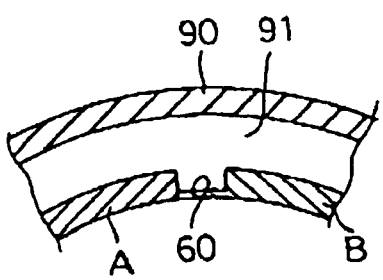
FIGS. 5A and 5B are sectional views of a cam of a drive ring made of a resin mold, used in a lens barrel of the present invention, taken along the lines I—I and II—II in FIG. 4, respectively.
Figure 5B:
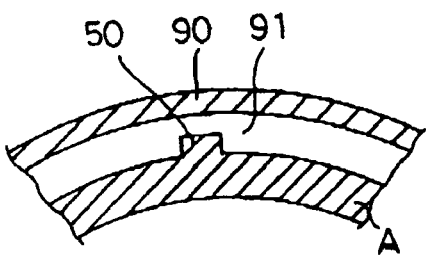

To mold the drive ring 3 using the cylindrical split dies shown in FIG. 4, a pair of cylindrical split dies A and B abut against each other at the parting line and are fastened. Thereafter, as shown in FIGS. 5A and 5B, the fastened cylindrical dies A and B are set in the annular profile molding die 90, with the axis of the cylindrical split dies A and B being aligned with the axis of the annular profile molding die 90. A plastic monomer is poured in the molding cavity 91 defined between the annular profile molding die 90 and the cylindrical split dies A and B to produce a plastic mold of the drive ring 3. The cam groove 5a and the cam projection 5b of the drive ring 3 are formed by the projection 50 and the molding cavity 60, respectively.

After completion of the molding operation, the cylindrical split die A is moved in the optical axis direction while rotating the cylindrical split die A about the optical axis L along the inclined parting line PL., in a direction indicated by an arrow LA shown in FIG. 4. Thereafter, the cylindrical split die B is drawn in the optical axis direction L, as indicated by an arrow LB shown in FIG. 4, so that the cylindrical split dies A and B can be released.

The requirement that the angle a of the projection 50 for forming the cam groove 5a is smaller than the angle β of the molding cavity 60 for forming the cam projection 5b (α<β) is necessary to part the dies A and B, as mentioned above.

Figure 6:
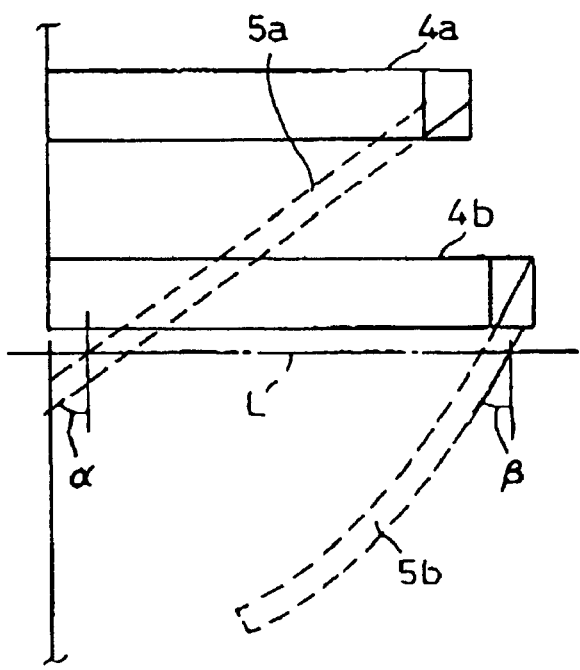
FIG. 6 is a developed view of a drive ring for a lens barrel of the present invention, in which a cam groove is formed by a linear groove and a cam projection is formed by a lead, by way of example.

Note that although both the cam groove 5a and the cam projection 5b are linear cams in the illustrated embodiment, it is possible to construct the cam groove 5a as a linear groove and the cam projection 5b as a non-linear cam, as shown in FIG. 6.

As can be understood from the above description, a lens barrel in which a cam ring can be easily molded can be achieved. Namely, one of the two dies for forming the cam ring can be pulled out easily in the optical axis direction. Also, the cams constituting members which move the first moving frame and the second moving frame in the optical axis direction are the cam groove and the cam projection. Hence, the cam ring can be easily manufactured even if the cam groove and the cam projection partly overlap each other in the optical axis direction. Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A lens barrel comprising:

a cam ring which is rotatable about an optical axis; and at least two linearly movable members provided one of inside and outside said cam ring, said linearly movable members being linearly guided in an optical axis direction;

wherein a plurality of cams are formed on one of an inner peripheral surface and an outer peripheral surface of said cam ring so as to correspond to said lineally movable members;

wherein at least two adjacent cams of said plurality of cams overlap each other at least partly as viewed in the optical axis direction, one of said two adjacent cams comprising a cam projection and the other of said two adjacent cams comprising a cam groove; and wherein a follower recess portion and a follower projection portion, which are relatively movably fitted into the cam projection and the cam groove, respectively, are respectively formed on said linearly movable members.

2. The lens barrel according to claim 1, further comprising a linear movement guide cylinder provided inside the cam ring, said linear movement guide cylinder having at least two linear movement guide grooves extending parallel to the optical axis;

wherein at least two radial projections are fitted into corresponding said linear movement guide grooves, wherein the follower projection portion and the follower recess portion are respectively formed on said radial projections.

3. The lens barrel according to claim 1, wherein the cam projection and the cam groove are linear.

4. The lens barrel according to claim 1, wherein the cam projection is a non-linear cam and the cam groove is a linear cam.

5. The lens barrel according to claim 1, wherein said linearly movable members comprise a first moving frame and a second moving frame, wherein the follower projection portion is formed on said first moving frame, and wherein the follower recess portion is formed on said second moving frame.

6. A lens barrel comprising:

a cam ring which is rotatable about an optical axis; and at least two linearly movable members provided one of inside and outside said cam ring, said linearly movable members being linearly guided in an optical axis direction;

wherein said cam ring includes a plurality of cams which are formed on one of an inner peripheral surface and an outer peripheral surface of said cam ring so as to correspond to said linearly movable members;

wherein at least two adjacent cams of said plurality of cams overlap each other at least partly as viewed in the optical axis direction, one of said two adjacent cams comprising a cam projection and the other of said two adjacent cams comprising a cam groove; and wherein said linearly movable members respectively include a follower recess portion and a follower projection portion, which are relatively movably fitted into the cam projection and the cam groove, respectively.

7. A cam ring of a lens barrel, comprising:

a plurality of cams which are formed on one of an inner peripheral surface and an outer peripheral surface of said cam ring;

linearly movable members provided one of inside and outside said cam ring corresponding to said one of an inner peripheral surface and an outer peripheral surface of said cam ring;

wherein at least two adjacent cams of said plurality of cams overlap each other at least partly as viewed in the optical axis direction, one of said two adjacent cams comprising a cam projection and the other of said two adjacent cams comprising a cam groove; and wherein a follower recess portion and a follower projection portion, which are respectively formed on said linearly movable members which are linearly guided in an optical axis direction, are relatively movably fitted into said cam projection and said cam groove, respectively.

* * * * *